US011012257B2

(12) United States Patent
Hamada

(10) Patent No.: US 11,012,257 B2
(45) Date of Patent: May 18, 2021

(54) HOME SIDE DEVICE AND METHOD OF CLEARING MANAGEMENT TABLE

(71) Applicant: SUMITOMO ELECTRIC INDUSTRIES, LTD., Osaka (JP)

(72) Inventor: Yohei Hamada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/490,976

(22) PCT Filed: Dec. 21, 2017

(86) PCT No.: PCT/JP2017/045978
§ 371 (c)(1),
(2) Date: Sep. 4, 2019

(87) PCT Pub. No.: WO2018/168144
PCT Pub. Date: Sep. 20, 2018

(65) Prior Publication Data
US 2020/0014554 A1 Jan. 9, 2020

(30) Foreign Application Priority Data
Mar. 16, 2017 (JP) .............................. JP2017-051203

(51) Int. Cl.
*H04L 12/44* (2006.01)
*H04J 14/02* (2006.01)
(Continued)

(52) U.S. Cl.
CPC .......... *H04L 12/44* (2013.01); *H04J 14/0235* (2013.01); *H04L 12/2879* (2013.01); *H04Q 11/0067* (2013.01); *H04W 88/12* (2013.01)

(58) Field of Classification Search
CPC combination set(s) only.
See application file for complete search history.

(56) References Cited

U.S. PATENT DOCUMENTS

2004/0010617 A1\* 1/2004 Akahane ............... H04L 47/783
709/243
2007/0133576 A1\* 6/2007 Tsuge .................. H04L 41/0226
370/401
(Continued)

FOREIGN PATENT DOCUMENTS

JP 2010-103655 A 5/2010
JP 2012-186601 A 9/2012
(Continued)

OTHER PUBLICATIONS

"MAC Address Acquisition," DOCSIS CM-SP-MULPIv3.0-I29-15210_9.1.2.1, MAC and Upper Layer Protocols Interface Specification, 2015, p. 277.

*Primary Examiner* — Omar S Ismail
(74) *Attorney, Agent, or Firm* — Faegre Drinker Biddle & Rath LLP

(57) ABSTRACT

A home side device according to one aspect of the present invention includes: a UNI port for a communication line used by one or a plurality of communication devices in a user's home; an access processing unit that performs upstream access control and holds a management table of address information of the communication devices; a detecting unit that detects link states of the communication devices; and a control unit that performs a process of clearing the management table when a link-down of all of the communication devices has been detected.

2 Claims, 7 Drawing Sheets

(51) Int. Cl.
*H04L 12/28* (2006.01)
*H04W 88/12* (2009.01)
*H04Q 11/00* (2006.01)

(56) References Cited

U.S. PATENT DOCUMENTS

| | | | | |
|---|---|---|---|---|
| 2007/0274290 | A1* | 11/2007 | Takahashi | H04L 12/4625 370/351 |
| 2007/0286217 | A1* | 12/2007 | Miyata | H04L 12/5692 370/401 |
| 2007/0297393 | A1* | 12/2007 | Furukawa | H04L 12/66 370/352 |
| 2008/0304828 | A1* | 12/2008 | Mizutani | H04J 14/0246 398/78 |
| 2012/0114331 | A1* | 5/2012 | Kamijo | H04Q 11/0067 398/35 |
| 2020/0014554 | A1* | 1/2020 | Hamada | H04J 14/0235 |

FOREIGN PATENT DOCUMENTS

| | | |
|---|---|---|
| JP | 2014-179836 A | 9/2014 |
| JP | 2015-135912 A | 7/2015 |

* cited by examiner

HOME SIDE DEVICE AND METHOD OF CLEARING MANAGEMENT TABLE

TECHNICAL FIELD

The present invention relates to a home side device suitably used in a PON system, etc., and a method of clearing a management table held in the home side device.

This application claims priority to Japanese Patent Application No. 2017-051203 filed Mar. 16, 2017, the entire content of which is incorporated herein by reference.

BACKGROUND ART

Patent Literatures 1 and 2 describe exemplary configurations of an optical network unit (ONU: an example of a "home side device".) used in a PON system.

The ONU in the PON system includes a PON processing unit. The PON processing unit of the ONU performs control for PON communication such as upstream access control, by exchanging multi-point control protocol (MPCP) messages with an optical line terminal (OLT: an example of a "station side device".) connected to a PON line.

CITATION LIST

Patent Literature

Patent Literature 1: Japanese Unexamined Patent Publication No. 2014-17986 (FIG. 3)
Patent Literature 2: Japanese Unexamined Patent Publication No. 2015-135912 (FIG. 2)

SUMMARY OF INVENTION (1) A device according to one aspect of the present disclosure includes: a UNI port for a communication line used by one or a plurality of communication devices in a user's home; an access processing unit that performs upstream access control; a holding unit that holds a management table of address information of the communication devices; a detecting unit that detects link states of the communication devices; and a control unit that performs a process of clearing the management table when a link-down of all of the communication devices has been detected.

(8) A method according to one aspect of the present disclosure is a method of clearing a management table held in a home side device that includes a UNI port for a communication line used by one or a plurality of communication devices in a user's home and that performs upstream access control, the management table including address information of the communication devices, and the method includes the steps of: detecting link states of the communication devices; and performing a process of clearing the management table when a link-down of all of the communication devices has been detected.

(9) A method according to another aspect of the present disclosure is a method of clearing a management table held in a home side device that includes a UNI port for a communication line used by one or a plurality of communication devices in a user's home and that performs upstream access control, the management table including address information of the communication devices, and the method includes the steps of: taking action to disable communication performed through the communication line being used by the communication devices; and allowing the home side device to detect a link-down of all of the communication devices by the action.

The present invention can not only be realized as a system and a device having characteristic configurations such as those described above, but can also be realized as a program for causing a computer to implement such characteristic configurations.

In addition, the present invention can be realized as a semiconductor integrated circuit that implements a part or all of the system and the device.

DESCRIPTION OF EMBODIMENTS

Figure 1:
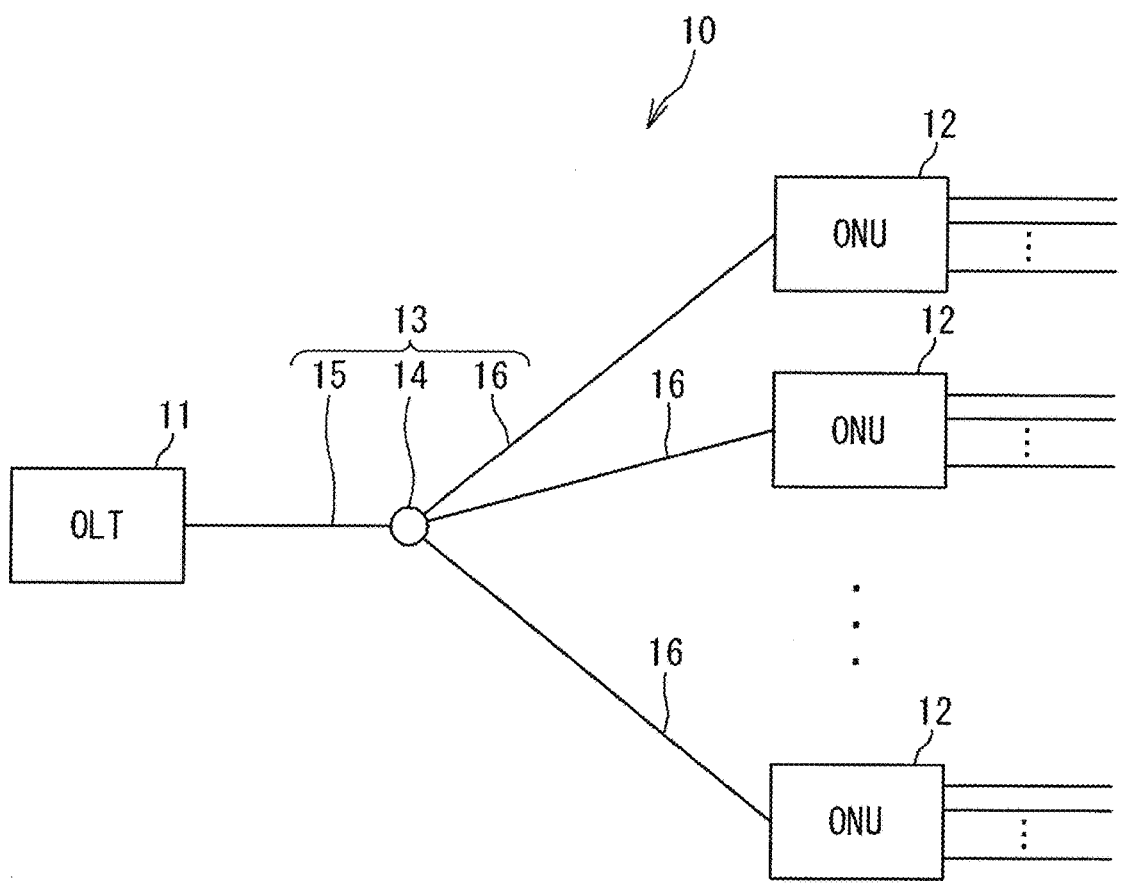
FIG. 1 is a schematic diagram of a PON system according to an embodiment of the present invention.

Problem to be Solved by the Present Disclosure

A PON processing unit of a home side device holds a management table that manages address information of communication devices in a user's home that communicate with the home side device using a communication line linked to a user network interface (UNI) port.

Some communication standards applied to a PON (e.g., "DPoE" (DOCSIS Provisioning of EPON)) have restrictions on the management table held in the PON processing unit, e.g., address information cannot be overwritten after reaching an upper limit for the number of pieces of data, and recorded address information cannot be deleted even after a lapse of time.

In a home side device that follows the above-described restrictions, once the number of pieces of data in the management table has reached an upper limit, even if a link-up is established with a new communication device, the PON processing unit does not record address information in the management table and thus the communication device cannot communicate with the home side device.

In this case, by manually performing a restart of the home side device involving power-off, the data in the management table is cleared, enabling to register address information of the new communication device in the management table.

However, if the management table can only be cleared by manually restarting the home side device, then it takes time and trouble to clear the management table. Therefore, a technique is desired that is capable of more easily clearing the address information management table held in the home side device.

In view of such a conventional problem, an object of the present disclosure is to provide a home side device, etc., that can easily clear an address information management table.

Advantageous Effect of the Present Disclosure

According to the present disclosure, an address information management table held in a home side device can be easily cleared.

Summary of an Embodiment of the Present Invention

A summary of an embodiment of the present invention will be listed and described below.

(1) A home side device according to the present embodiment includes: a UNI port for a communication line used by one or a plurality of communication devices in a user's home; an access processing unit that performs upstream access control; a holding unit that holds a management table of address information of the communication devices; a detecting unit that detects link states of the communication devices; and a control unit that performs a process of clearing the management table when a link-down of all of the communication devices has been detected.

According to the home side device of the present embodiment, when a link-down of all communication devices in the user's home has been detected, the control unit performs a process of clearing the management table, and thus, without a user manually restarting the home side device, the management table can be automatically cleared. Hence, the address information management table can be easily cleared.

Particularly, in the case of a home side device for a multi-dwelling unit which is installed in a management room, there is an advantage that the management table can be cleared without a user obtaining approval from a manager.

(2) In the home side device of the present embodiment, it is preferred that the clearing process be performed after a lapse of a predetermined time from a point in time of the detection of the link-down.

The reason therefor is that if a clearing process is performed immediately after detecting a link-down, even in a case of a momentary link-down of communication devices caused by a lightning strike, etc., the management table is cleared and it may rather take time to recover communication between the communication devices and the home side device.

(3) In the home side device of the present embodiment, it is preferred that the control unit be capable of receiving a management frame including a set value of the predetermined time from an external device.

By doing so, by an operational input to the external device, the predetermined time used when a clearing process is performed can be set to a telecommunications carrier's desired set value.

(4) In the home side device of the present embodiment, it is preferred that types of the clearing process include at least one of: a first process for restarting the access processing unit; a second process for erasing the address information in the management table; and a third process for restarting the home side device.

The reason therefor is that if the first process or the second process is adopted, then the home side device does not need to be restarted, and thus, in the case of a home side device for a multi-dwelling unit, a management table related to communication devices in a user's home can be cleared without interrupting communication at other users' homes.

In addition, in the case of a home side device for a single home, even if the third process is adopted, communication at other users' homes is not affected.

(5) In the home side device of the present embodiment, it is preferred that the control unit be capable of receiving a management frame including a type of the clearing process from an external device.

By doing so, by an operational input to the external device, a type of a clearing process can be set to a telecommunications carrier's desired type.

(6) In the home side device of the present embodiment, it is preferred that the control unit be capable of communicating with the communication devices, and when a number of pieces of data in the management table has reached an upper limit, the control unit transmit a communication message to the communication devices, the communication message being for informing a user at the user's home that the number of pieces of data in the management table has reached the upper limit.

By doing so, the user can become aware in advance of the fact that any more communication devices cannot be newly connected. Hence, the frequency of users inquiring the telecommunications carrier by phone, etc., about a cause of not being able to newly connect a communication device can be reduced.

(7) In the home side device of the present embodiment, it is preferred that the home side device further include: UNI ports of a plurality of types whose connectable communication lines differ from each other; and a switch for selecting any of the UNI ports used in the user's home, and the control unit perform the clearing process when transmitting to the switch an instruction to switch the UNI ports.

By doing so, when a communication line pulled into the home is changed, only by connecting a communication device to the changed communication line, address information of the communication device can be registered in the management table.

(8) A method according to the present embodiment is a method of clearing a management table held in a home side device that includes a UNI port for a communication line used by one or a plurality of communication devices in a user's home and that performs upstream access control, the management table including address information of the communication devices, and the method includes the steps of: detecting link states of the communication devices; and performing a process of clearing the management table when a link-down of all of the communication devices has been detected.

According to the clearing method of the present embodiment, when a link-down of all communication devices in the user's home has been detected, a process of clearing the management table is performed, and thus, without a user manually restarting the home side device, the management table can be automatically cleared. Hence, the address information management table can be easily cleared.

Particularly, in the case of a home side device for a multi-dwelling unit which is installed in a management room, there is an advantage that the management table can be cleared without a user obtaining approval from a manager.

(9) Another method according to the present embodiment is a method of clearing a management table held in a home side device that includes a UNI port for a communication line used by one or a plurality of communication devices in a user's home and that performs upstream access control, the management table including address information of the communication devices, and the method includes the steps of: taking action to disable communication performed through the communication line being used by the communication devices; and allowing the home side device to detect a link-down of all of the communication devices by the action.

According to the clearing method of the present embodiment, by taking action to disable communication performed through a communication line being used by communication devices, a link-down of all communication devices is detected by the home side device, and thus, without a user manually restarting the home side device, the management table can be automatically cleared. Hence, the address information management table can be easily cleared.

Particularly, in the case of a home side device for a multi-dwelling unit which is installed in a management room, there is an advantage that the management table can be cleared without a user obtaining approval from a manager.

A Detail of an Embodiment of the Present Invention

A detail of an embodiment of the present invention will be described below with reference to the drawings. Note that at least part of the embodiment described below may be arbitrarily combined.

[Overall Configuration of a PON System]

FIG. 1 is a schematic diagram of a PON system 10 according to an embodiment of the present invention.

As shown in FIG. 1, the PON system 10 of the present embodiment includes a station side device (OLT) 11, a plurality of home side devices (ONUs) 12, and a PON line 13.

User terminals (not shown in FIG. 1) that can perform Ethernet ("Ethernet" is a registered trademark.) communication can be connected to UNI ports 35 and 36 (see FIG. 2) of each ONU 12. The number and type of user terminals to be connected to the ONU 12 are not particularly limited. It is not essential either that user terminals be directly connected to the ONU 12.

A user network (not shown) may be connected to the ONU 12. A user terminal may be connected to the ONU 12 through the user network.

The PON line 13 is an optical communication line including an optical splitter 14 and optical fibers 15 and 16. The PON line 13 includes one trunk optical fiber 15 and a plurality of branch optical fibers 16. Each of the optical fibers 15 and 16 is connected to the optical splitter 14.

An optical signal transmitted from the OLT 11 passes through the trunk optical fiber 15 of the PON line 13 and is split by the optical splitter 14. The split optical signals pass through the branch optical fibers 16 and are transmitted to the respective ONUs 12.

Optical signals transmitted from the respective ONUs 12 pass through the branch optical fibers 16 and are converged by the optical splitter 14. The converged optical signal passes through the trunk optical fiber 15 and is transmitted to the OLT 11.

The optical splitter 14 used in the PON line 13 does not particularly require external power supply, and passively splits or multiplexes an inputted optical signal(s).

Upstream optical signals transmitted to the branch optical fibers 16 are merged at the optical splitter 14. Therefore, multiplexing for preventing optical signals of the same wavelength from colliding with each other after merging is required.

In the PON system 10, time division multiplexing conforming to the MPCP is performed. Specifically, the OLT 11 computes, based on a control frame (report) transmitted from each ONU 12, an upstream transmission start time and the amount of upstream transmission allowed for data accumulated in the ONU 12.

Then, the OLT 11 transmits a control frame (grant) having an instruction signal inserted therein to each ONU 12 through the PON line 13. Each ONU 12 notifies the OLT 11 by a report of the length of data in a buffer thereof, at a time specified by the grant.

Each ONU 12 receives a grant having an instruction signal inserted therein from the OLT 11. Based on the instruction signal, each ONU 12 transmits data in the buffer thereof together with a report to the OLT 11.

In addition to the above, the OLT 11 detects an ONU 12 on the PON line 13 by performing a discovery process. In addition, the OLT 11 performs a registration process for registering the detected ONU 12 in the OLT 11.

[Internal Configuration of the OLT]

Figure 2:
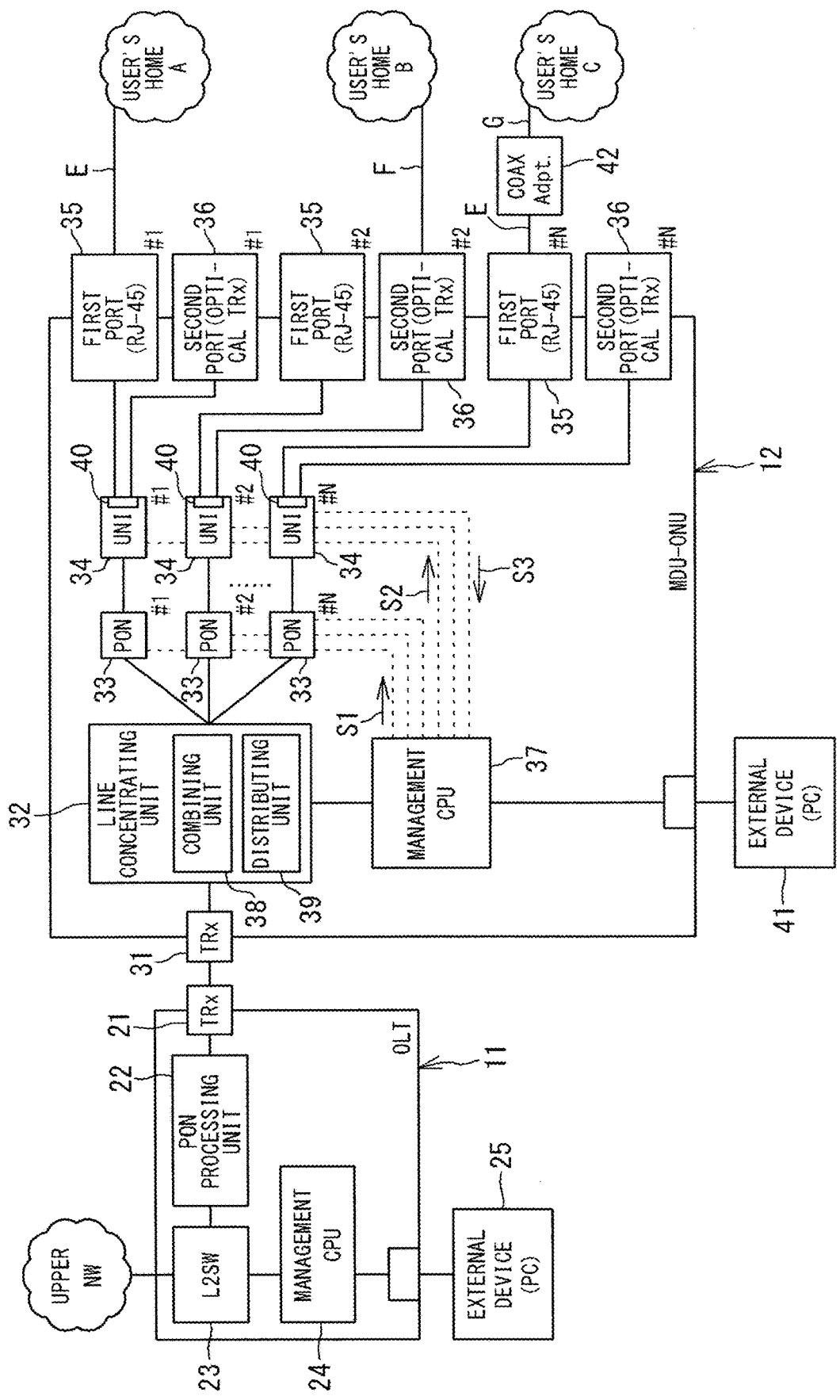
FIG. 2 is a block diagram showing an example of internal configurations of an OLT and an ONU.

FIG. 2 is a block diagram showing an example of internal configurations of the OLT 11 and the ONU 12.

As shown in FIG. 2, the OLT 11 includes an optical transceiver 21, a PON processing unit 22, an L2 switch 23, and a management control unit 24. The management control unit 24 is composed of a central processing unit (CPU), a memory, and the like.

The optical transceiver 21 is an optical device (e.g., a pluggable optical transceiver) including a circuit that transmits and receives optical signals. The optical transceiver 21 is optically connected to the trunk optical fiber 15 (see FIG. 1), and is electrically connected to the PON processing unit 22.

The optical transceiver 21 mutually converts an optical signal and an electrical signal. Namely, the optical transceiver 21 converts an upstream signal which is an optical signal from the ONU 12 into an electrical signal. The optical transceiver 21 converts a downstream signal which is an electrical signal from the PON processing unit 22 into an optical signal.

The PON processing unit 22 is composed of an integrated circuit that performs a predetermined communication process, etc., conforming to a communication standard for the PON.

When an upstream signal is a control frame (report) from the ONU 12, the PON processing unit 22 determines an upstream transmission start time and the amount of upstream transmission allowed for the ONU 12, and notifies the ONU 12 of a control frame (grant). The PON processing unit 22 also performs the aforementioned discovery process and registration process, etc.

When a frame included in an upstream signal is a data frame destined for an upper network, the PON processing unit 22 transmits the frame to the L2 switch 23.

When a frame included in a downstream signal is a data frame destined for the ONU 12, the PON processing unit 22 allows the optical transceiver 21 to transmit the frame.

The L2 switch 23 is composed of an integrated circuit that determines a transmission port, according to a destination of a received L2-layer frame.

When a frame included in a downstream signal from the upper network is destined for a PON processing unit 33 of the ONU 12, the L2 switch 23 transmits the frame to the PON processing unit 22 of the OLT 11.

When a frame included in an upstream signal from the PON processing unit 22 is a data frame destined for the upper network, the L2 switch 23 transmits the frame to the upper network.

When a frame included in an upstream signal from the PON processing unit 22 is a management frame destined for the management control unit 24, the L2 switch 23 transmits the frame to the management control unit 24.

The L2 switch 23 can change a quality-of-service (QoS) parameter of a downstream signal for each PON processing unit 33 of the ONU 12.

For example, the L2 switch 23 adjusts the amount of data communicated for a downstream signal destined for the PON processing unit 33, such that the value of a QoS parameter (e.g., maximum communication bandwidth (Mbps)) which is instructed by the management control unit 24 is obtained.

The management control unit 24 is connected to a dedicated port of the L2 switch 23, and can communicate with a management control unit 37 of the ONU 12, using the PON line 13. The management control unit 24 is communicably connected to an external device 25 which is a personal computer (PC), etc. The external device 25 may communicate with the management control unit 24 through the upper network.

Note that the internal configuration of the OLT 11 is not limited to that of FIG. 2. For example, the PON processing unit 22 and the management control unit 24 may be integrated into a single integrated circuit.

[Internal Configuration of the ONU]

The ONU 12 of the present embodiment is an ONU suitable for increasing communication speed in an existing multi-dwelling unit (MDU). Hence, the ONU may be called an "MDU-ONU".

As shown in FIG. 2, the MDU-ONU 12 includes an optical transceiver 31, a line concentrating unit 32, a plurality of PON processing units 33, a plurality of UNI processing units 34, first and second ports 35 and 36, and a management control unit 37. The management control unit 37 is composed of a CPU, a memory, and the like.

The optical transceiver 31 is an optical device (e.g., a pluggable optical transceiver) including a circuit that transmits and receives optical signals. The optical transceiver 31 is optically connected to the branch optical fiber 16 (see FIG. 1), and is electrically connected to the line concentrating unit 32.

The optical transceiver 31 mutually converts an optical signal and an electrical signal. Namely, the optical transceiver 31 converts a downstream signal which is an optical signal from the OLT 11 into an electrical signal. The optical transceiver 31 converts an upstream signal which is an electrical signal from the line concentrating unit 32 into an optical signal.

The line concentrating unit 32 is an integrated circuit that determines a communication path between the optical transceiver 31 and the plurality of PON processing units 33. The line concentrating unit 32 includes a combining unit 38 and a distributing unit 39.

The combining unit 38 combines a plurality of communication paths connected to the plurality of PON processing units 33, respectively, at a port to which the optical transceiver 31 is connected. The distributing unit 39 distributes a downstream signal (electrical signal) from the optical transceiver 31 to the plurality of PON processing units 33.

The line concentrating unit 32 is composed of, for example, a field-programmable gate array (FPGA). However, the configurations of the combining unit 38 and the distributing unit 39 for attaining the above-described functions are not particularly limited.

Namely, the combining unit 38 may be a logic circuit included in the FPGA or may be an electrical switch. The distributing unit 39 may be a logic circuit included in the FPGA or may be wiring lines.

Each PON processing unit 33 is composed of an integrated circuit (e.g., a PON-MAC chip) that performs various processes on a downstream signal and an upstream signal.

The PON processing units 33 perform a predetermined communication process (PON communication) including upstream access control that conforms to a communication standard for the PON, with the OLT 11 which is a terminal device on a station building side of the PON system 10.

For example, when a destination MAC address of a downstream signal matches a MAC address of the ONU 12, a PON processing unit 33 performs upstream access control, according to a control frame (grant) included in the downstream signal.

In addition, a PON processing unit 33 transmits a data frame included in a downstream signal to a corresponding UNI processing unit 34. In addition to the above-described processes, the PON processing units 33 may perform various processes, e.g., a decoding process and an error correction process.

When a PON processing unit 33 receives a frame from a corresponding UNI processing unit 34, the PON processing unit 33 analyzes a header of the frame. The PON processing unit 33 temporarily accumulates the frame.

One of the plurality of (in FIG. 2, #1 to #N) PON processing units 33 transmits a frame together with an upstream transmission allowance command (burst enable signal) in an upstream direction, in accordance with a grant received from the OLT 11.

Each UNI processing unit 34 is composed of an integrated circuit (e.g., a PHY chip) that performs signal conversion, a communication process, and the like, in a physical layer.

A UNI processing unit 34 converts an upstream signal received from a first or second port 35 or 36 into a layer-2 electrical signal, and transmits the converted electrical signal to a corresponding PON processing unit 33. The UNI processing unit 34 converts a downstream signal received from the PON processing unit 33 into a layer-1 electrical signal, and sends out the converted electrical signal to the first or second port 35 or 36.

The MDU-ONU 12 includes N (#1 to #N, e.g., N=8) PON processing units 33 and N UNI processing units 34. Therefore, the ONU 12 can be connected to N users' homes in total by predetermined communication lines.

The MDU-ONU 12 is of a multi-line type that can select any of a plurality of types of communication lines for a single UNI processing unit 34. In the example of FIG. 2, each UNI processing unit 34 is linked to a first port 35 for Ethernet and a second port 36 for optical communication.

Namely, the first port 35 is a UNI port for connecting a local area network (LAN) cable E, and the second port 36 is a UNI port for connecting an optical fiber F.

The second port 36 is composed of an optical device (e.g., a pluggable optical transceiver) including a circuit that transmits and receives optical signals. The second port 36 converts an optical signal from the optical fiber F into an electrical signal and sends out the electrical signal to the UNI processing unit 34, and converts an electrical signal from the UNI processing unit 34 into an optical signal and sends out the optical signal to the optical fiber F.

Each UNI processing unit 34 includes a switching switch 40 for the UNI ports 35 and 36. The switching switch 40 switches a connection destination of an electrical signal of the UNI processing unit 34 between the first port 35 and the second port 36, according to a control instruction S2 from the management control unit 37.

Therefore, the ONU 12 of the present embodiment can select communication cables connected to the MDU-ONU 12, according to the types of communication lines used in users' homes A to C.

The user's home A uses a LAN cable E. Thus, the switching switch 40 of the #1 UNI processing unit 34 has electrical conduction with the first port 35, and the #1 UNI processing unit 34 is connected to the user's home A by the LAN cable E.

The user's home B uses an optical fiber F. Thus, the switching switch 40 of the #2 UNI processing unit 34 has electrical conduction with the second port 36, and the #2 UNI processing unit 34 is connected to the user's home B by the optical fiber F.

The user's home C uses a coaxial cable G. Thus, the switching switch 40 of the #N UNI processing unit 34 has electrical conduction with the first port 35, and a coaxial adapter 42 is connected to a LAN cable E linked to the first port 35.

The coaxial adapter 42 is an adapter that mutually converts an Ethernet signal and a radio frequency (RF) signal. Hence, the #N UNI processing unit 34 is connected to the user's home C by the coaxial cable G connected to the LAN cable E through the coaxial adapter 42.

The management control unit 37 is connected to a dedicated port of the line concentrating unit 32, and can communicate with the management control unit 24 of the OLT 11 using the PON line 13. The management control unit 37 is communicably connected to an external device 41 which is a personal computer (PC), etc.

The management control unit 37 is connected to all of the PON processing units 33 and UNI processing units 34 mounted on the ONU 12 by predetermined signal lines indicated by broken lines, and can input predetermined control signals S1 and S2 to each of the processing units 33 and 34.

The control signal S1 transmitted from the management control unit 37 to a PON processing unit 33 includes, for example, a "restart instruction" for the PON processing unit 33 or a "clear instruction" for a management table (see FIG. 4) held in a memory of the PON processing unit 33.

The control signal S2 transmitted from the management control unit 37 to a UNI processing unit 34 includes, for example, a "switching instruction" for the switching switch 40 of the UNI processing unit 34.

Each UNI processing unit 34 monitors a link state of a communication device that uses a communication line connected to the first or second port 35 or 36 in operation.

The UNI processing unit 34 transmits a monitoring signal S3 indicating the link state (link-up or link-down) of the communication device at the present time to the management control unit 37 in a predetermined transmission cycle.

Note that the internal configuration of the ONU 12 is not limited to that of FIG. 2. For example, a PON processing unit 33 and a UNI processing unit 34 may be integrated into a single integrated circuit, or the management control unit 37 and the plurality of PON processing units 33 may be integrated into a single integrated circuit.

[Exemplary Application of the ONU to a Multi-Dwelling Unit]

Figure 3:
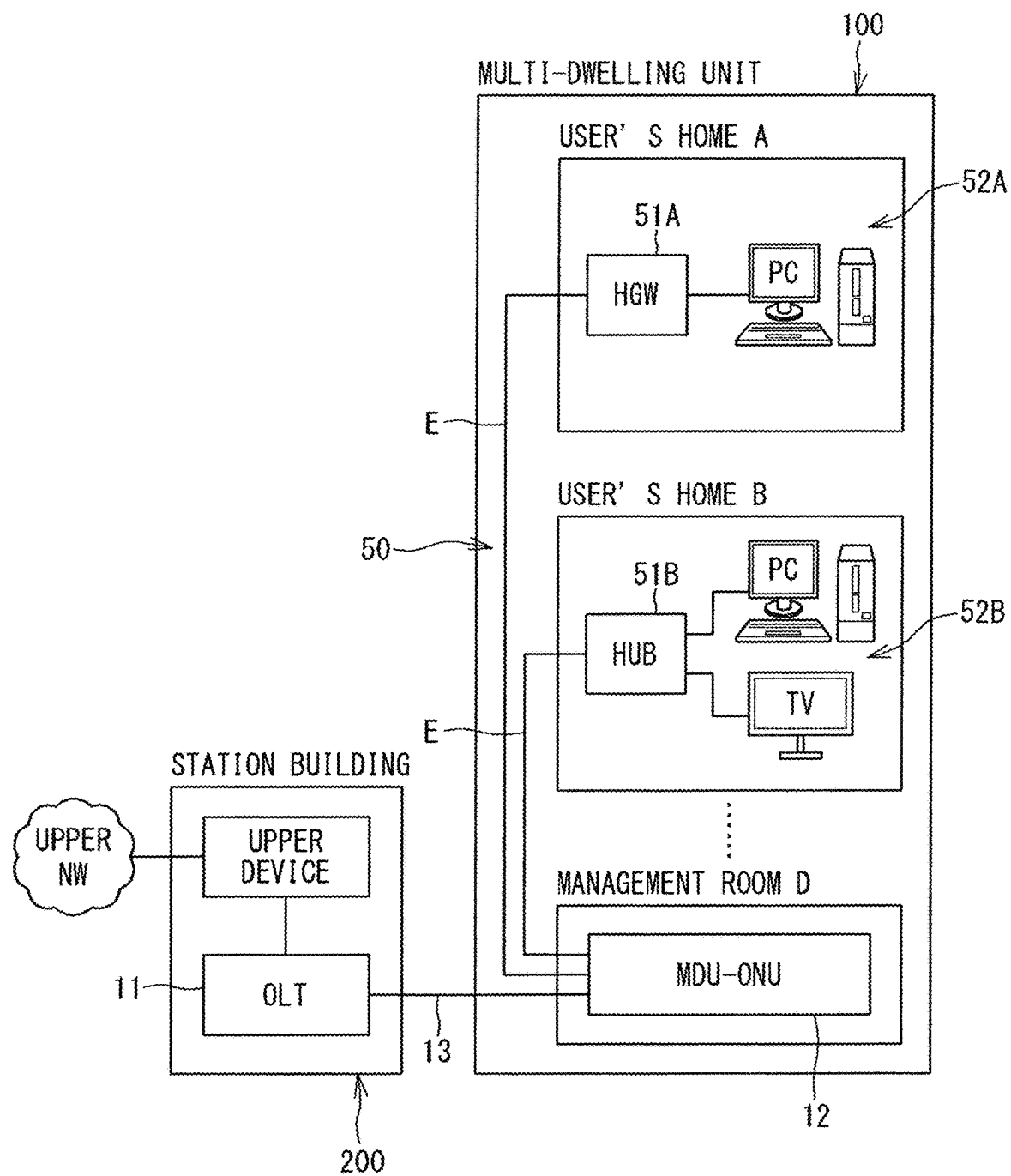
FIG. 3 is a block diagram showing an example of a wiring line structure of an in-home communication system installed in a multi-dwelling unit.

FIG. 3 is a block diagram showing an example of a wiring line structure of an in-home communication system 50 installed in a multi-dwelling unit 100.

As shown in FIG. 3, the multi-dwelling unit 100 is a building with a plurality of floors (two or more floors), and includes a management room D on the first floor and users' homes A and B provided on the second and higher floors. There may be three or more users' homes A and B. The management room D may be on the rooftop or on the second or higher floor instead of on the first floor.

The in-home communication system 50 includes the MDU-ONU 12 installed in the management room D; relay devices 51A and 51B installed in the users' homes A and B, respectively; and one or a plurality of user terminals 52A and 52B connected to the relay devices 51A and 51B.

The ONU 12 in the management room D is connected to the OLT 11 in a station building 200 through the PON line 13, forming, together with the OLT 11, the aforementioned PON system 10 (see FIG. 1).

The relay device 51A in the user's home A is, for example, a home gateway (HGW) having a network address port translation (NAPT) function.

Therefore, a PON processing unit 33 of the ONU 12 for the user's home A needs to recognize only the HGW 51A in the user's home A as a layer-2 communication device, and does not need to register the MAC address of the user terminal 52A linked to the HGW 51A in a management table.

The relay device 51B in the user's home B is, for example, an L3 switch that does not have the NAPT function, specifically, a switching hub (HUB).

Therefore, a PON processing unit 33 of the ONU 12 for the user's home B needs to recognize each user terminal 52B in the user's home B as a layer-2 communication device, and needs to register the MAC addresses of the user terminals 52B linked to the HUB 51B in a management table.

Communication lines installed in the multi-dwelling unit 100 are LAN cables E. Therefore, the HGW 51A and the HUB 51B in the users' homes A and B are connected to the MDU-ONU 12 through the LAN cables E.

However, the communication lines installed in the multi-dwelling unit 100 may be optical fibers F. In this case, the MDU-ONU 12 is connected through the optical fibers F to the HGW 51A and the HUB 51B that have optical communication ports.

The communication lines installed in the multi-dwelling unit 100 may be coaxial cables G. In this case, the MDU-ONU 12 is connected through the coaxial cables G to the HGW 51A and the HUB 51B that have coaxial communication ports.

The communication lines installed in the multi-dwelling unit 100 may be of a plurality of types including at least two of the following: a LAN cable E, an optical fiber F, and a coaxial cable B. In this case, the MDU-ONU 12 is connected to the HGW 51A and the HUB 51B through the communication lines of different types.

[Problems of a Management Table]

Figure 4:
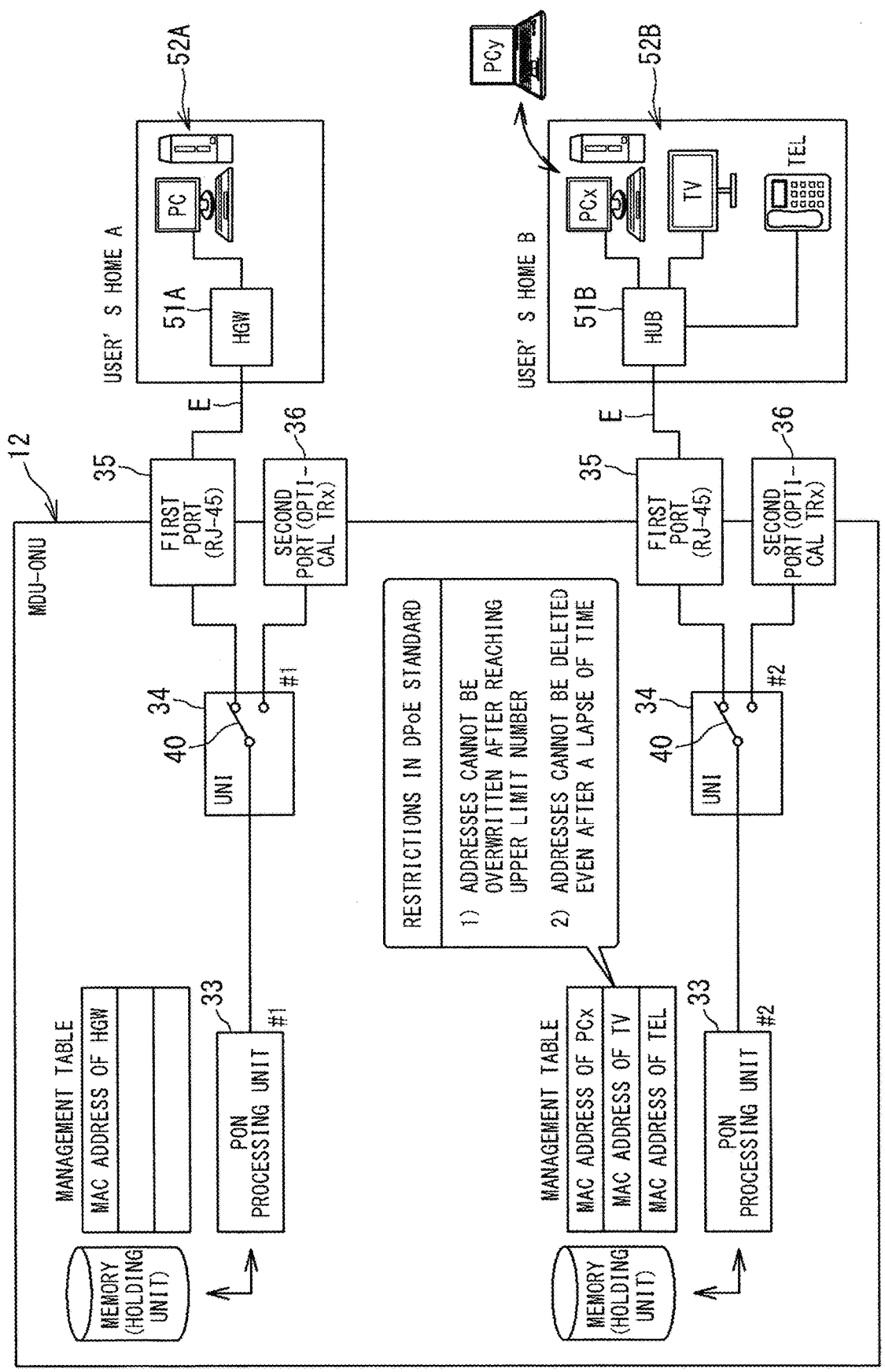
FIG. 4 is an illustrative diagram showing problems of a management table.

FIG. 4 is an illustrative diagram showing problems of the management table held in the PON processing unit 33.

As shown in FIG. 4, each PON processing unit 33 composed of a MAC chip includes therein a memory (holding unit), and the memory holds a "management table".

The management table is a management table of the MAC addresses of communication devices linked to the first port 35 or the second port 36.

Note that although FIG. 4 exemplifies a case in which each PON processing unit 33 has its own memory (holding unit), the configuration may be such that a single memory having MAC address storage areas for the respective #1 to #N PON processing units 33 is shared by the PON processing units 33.

In the #1 PON processing unit 33 for the user's home A, the first port 35 is selected by the switch 40 of the UNI processing unit 34, and the HGW 51A in the user's home A is connected to the LAN cable E linked to the first port 35.

When the #1 UNI processing unit 34 obtains a MAC address from the HGW 51A having been linked up, the #1 UNI processing unit 34 notifies the #1 PON processing unit 33 of the obtained MAC address. The #1 PON processing unit 33 records the notified MAC addresses of the HGW 51A in the management table.

In the #2 PON processing unit 33 for the user's home B, the first port 35 is selected by the switch 40 of the UNI processing unit 34, and the HUB 51B in the user's home B is connected to the LAN cable E linked to the first port 35.

When the #2 UNI processing unit 34 obtains a MAC address from each user terminal 52B having been linked up (in FIG. 4, a personal computer PCx, a television set TV, and a telephone set TEL), the #2 UNI processing unit 34 notifies the #2 PON processing unit 33 of the obtained MAC addresses. The #2 PON processing unit 33 records the notified MAC addresses of the user terminals in the management table.

Here, "DPoE" (DOCSIS Provisioning of EPON) which is an integrated network standard of "DOCSIS" and "EPON" developed by "CableLabs" includes the section "9.1.2.1 MAC Address Acquisition" in DOCSIS CM-SP-MULPIv3.0-I29-151210, as an essential requirement.

According to this specification, deletion of address information (MAC addresses) of communication devices over time, replacement of terminal information for when a new terminal has detected after reaching an upper limit number, and holding of information in a nonvolatile area and setting of the held content after a restart are not allowed.

When the above-described content of the specification is summarized, the management table held in the PON processing unit 33 has the following restrictions 1 and 2 based on the communication standard:

1) MAC addresses cannot be overwritten after reaching an upper limit for the number of pieces of data; and 2) Recorded MAC addresses cannot be deleted even after a lapse of time.

Note that "CableLabs", "DPoE", and "DOCSIS" are a trademark or registered trademark of "Cable Television Laboratories, Inc." of U.S. in the U.S. and other countries.

If it is assumed that the upper limit number for the number of pieces of data that can be registered in the management table is set to, for example, "3", in the case of the #1 PON processing unit 33, two other MAC addresses can be recorded in the management table.

Therefore, when a user living in the user's home A removes the HGW 51A from the LAN cable E and replaces it with another communication device, the UNI processing unit 34 detects a link-up thereof, and the MAC address of the communication device is recorded in the second entry of the management table.

On the other hand, in the case of the #2 PON processing unit 33, the MAC addresses of the personal computer PCx, the television set TV, and the telephone set TEL are recorded in the management table, and the upper limit number (=3) for MAC addresses has been reached.

Therefore, when a user living in the user's home B removes the personal computer PCx from the HUB 51B and replaces it with another personal computer PCy, even if the UNI processing unit 34 detects a link-up of the personal computer PCy, the PON processing unit 33 does not record the MAC address of the personal computer PCy in the management table.

In this case, by performing a restart of the MDU-ONU 12 which involves power-off, the data in the memory of the #2 PON processing unit 33 is erased.

Thus, the MAC address data recorded in the management table of the #2 PON processing unit 33 is all cleared, enabling to newly register the MAC address of the personal computer PCy in the management table of the #2 PON processing unit 33.

However, if the management table can only be cleared by manually restarting the ONU 12, then there is a problem that it takes time and trouble to clear the management table.

Particularly, in the case of the MDU-ONU 12, since the MDU-ONU 12 is installed in the management room D (see FIG. 3), restarting the ONU 12 by the user living in the user's home B requires approval from a manager, and thus, takes a lot of time and trouble.

In addition, for the measure of restarting the MDU-ONU 12, since all PON processing units 33 included in the ONU 12 are temporarily stopped, there is another problem that communication at another user's home A other than the user's home B is also interrupted.

[Process of Clearing a Management Table]

In the ONU 12 of the present embodiment, to solve the above-described problems, the management control unit 37 of the ONU 12 allows, according to a link-down of a communication device using a UNI port 35, a PON processing unit 33 for the UNI port 35 in which the link-down has occurred, to clear a management table held in the PON processing unit 33 (an automatic clearing process).

Figure 5:
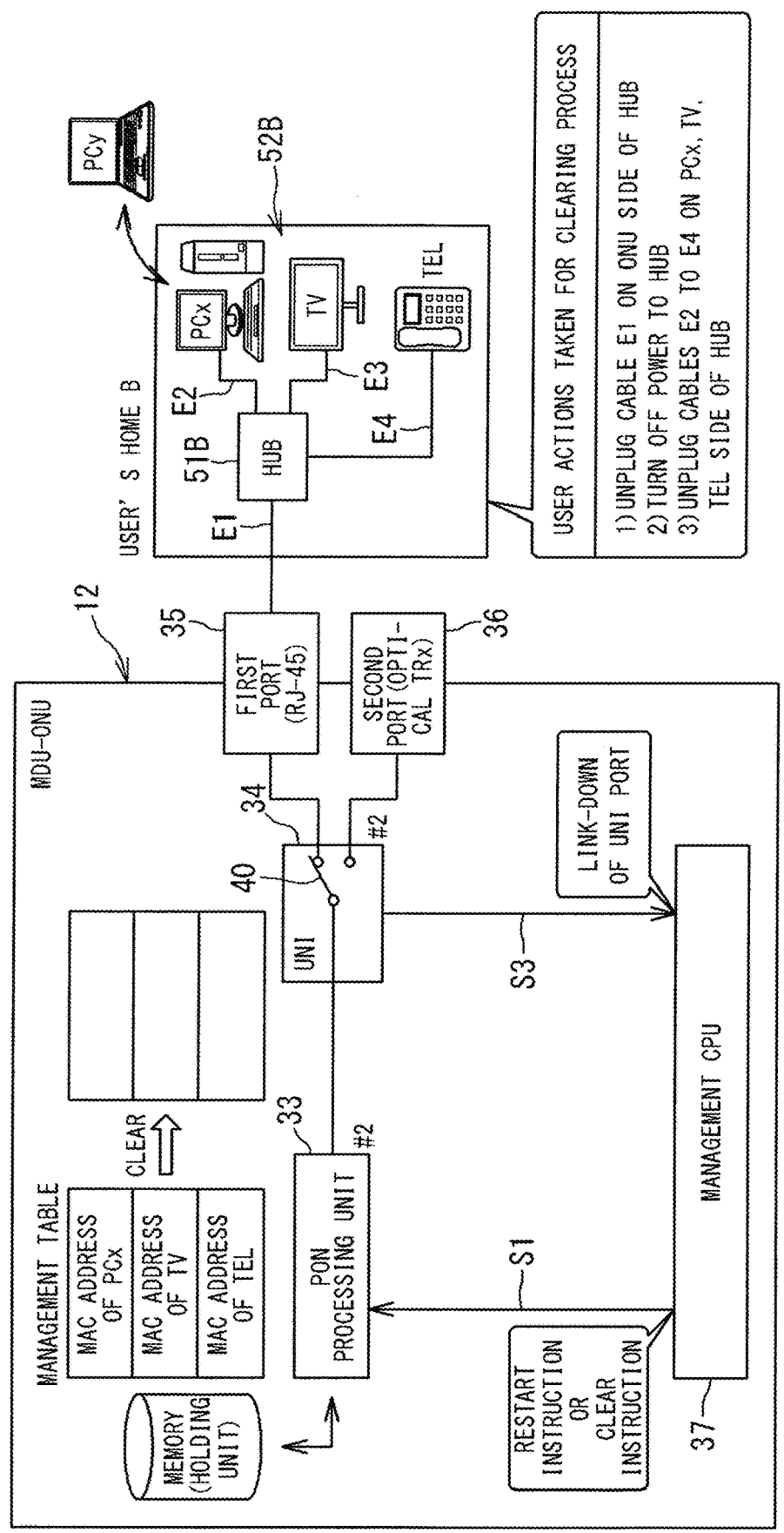
FIG. 5 is an illustrative diagram showing an example of a process of clearing a management table.

FIG. 5 is an illustrative diagram showing an example of a process of clearing a management table performed by the management control unit 37.

As described above, each UNI processing unit 34 monitors a link state of a communication device that uses a communication line connected to the first or second port 35 or 36, and transmits a monitoring signal S3 indicating the link state (link-up or link-down) of the communication device to the management control unit 37 in a predetermined transmission cycle.

Hence, the management control unit 37 transmits to the #2 PON processing unit 33 a control signal S1 for clearing the management table, at a point in time when a predetermined time T (T is a delay time sufficiently longer than a momentary interruption time (e.g., 0.1 to 2 seconds) caused by a lightning strike, etc.; for example, 10 seconds) has elapsed since the monitoring signal S3 received from the UNI processing unit 34 has changed from a link-up to a link-down.

As described above, the control signal S1 includes either a restart instruction for the PON processing unit 33 or a clear instruction for the management table.

Therefore, by the #2 PON processing unit 33 restarting in response to the restart instruction or erasing data in the management table in response to the clear instruction, the data recorded in the management table of the #2 PO processing unit 33 is cleared.

As such, according to the ONU 12 of the present embodiment, the management control unit 37 allows the #2 PON processing unit 33 to clear the management table, in response to a link-down of communication devices that are using the UNI port (in FIG. 5, the first port 35) at the user's home B.

Hence, without a user manually restarting the ONU 12, a user at the user's home B can register the MAC address of a new communication device (e.g., a personal computer PCy) in the management table of the #2 PON processing unit 33.

In addition, since there is no need to restart the entire MDU-ONU 12, communication of a PON processing unit 33 other than #2 included in the ONU 12 is not interrupted. Thus, there is another advantage that the MAC address of a communication device in the user's home B can be registered without interrupting communication at another user's home A.

Although FIG. 5 exemplifies a case in which the #2 PON processing unit 33 clears the management table, the management control unit 37 can perform a process of clearing a management table using a monitoring signal S3 and a control signal S1 on all (#1 to #N) PON processing units 33 included in the ONU 12.

[User Actions Taken to Perform a Clearing Process]

As described above, in the ONU 12 of the present embodiment, the management control unit 37 allows the #2 PON processing unit 33 to clear the management table on condition of a link-down of communication devices that use a communication line connected to the #2 UNI port 35.

Hence, when a user living in the user's home B desires to perform a process of clearing a management table for the #2 PON processing unit 33 for his/her user's home B among the PON processing units 33 included in the ONU 12 in the management room D, the user intentionally takes action to allow the #2 UNI processing unit 34 to detect a link-down for the predetermined time T.

Namely, the user at the user's home B takes action to interrupt communication that uses the LAN cable E1 linked to the UNI port (in FIG. 5, the first port 35) of the #2 UNI processing unit 34 for the predetermined time T. For the action, for example, the following action 1 to 3 are considered.

Note that the above-described action to be taken by the user is also the same for when the communication line is an optical fiber F or a coaxial cable G Action 1) Temporarily unplug the LAN cable E1 on an ONU 12 side running from the management room D to the user's home from the HUB 51B, and wait for the predetermined time T to elapse.

Action 2) Temporarily turn off the power to the HUB 51B and wait for the predetermined time T to elapse.

Action 3) Temporarily unplug LAN cables E2 to E4 linked to the personal computer PCx, the television set TV, and the telephone set TEL from the HUB 51B, and wait for the predetermined time T to elapse.

By the user at the user's home B taking any of the above-described action 1 to 3, the management control unit 37 of the ONU 12 performs a clearing process for the #2 PON processing unit 33.

Thereafter, the user at the user's home B connects the personal computer PCy to the LAN cable E2 instead of the personal computer PCx, and resumes communication with the ONU 12. In this case, when a logical link with each user terminal 52B is newly established, the #2 PON processing unit 33 registers the MAC addresses of the personal computer PCy, the television set TV, and the telephone set TEL in its management table.

It is desirable that a telecommunications carrier that operates the MDU-ONU 12 notify users at the users' homes A to C in the multi-dwelling unit 100 by a booklet, a website, etc., that management tables for their homes can be cleared by the above-described action 1 to 3.

By doing so, only by replacing with the new personal computer PCy, the user's home B can be prevented from becoming unable to communicate with the ONU 12, which is considered to contribute to a reduction in the number of inquiries from users.

[Process of Determining a Link State]

Figure 6:
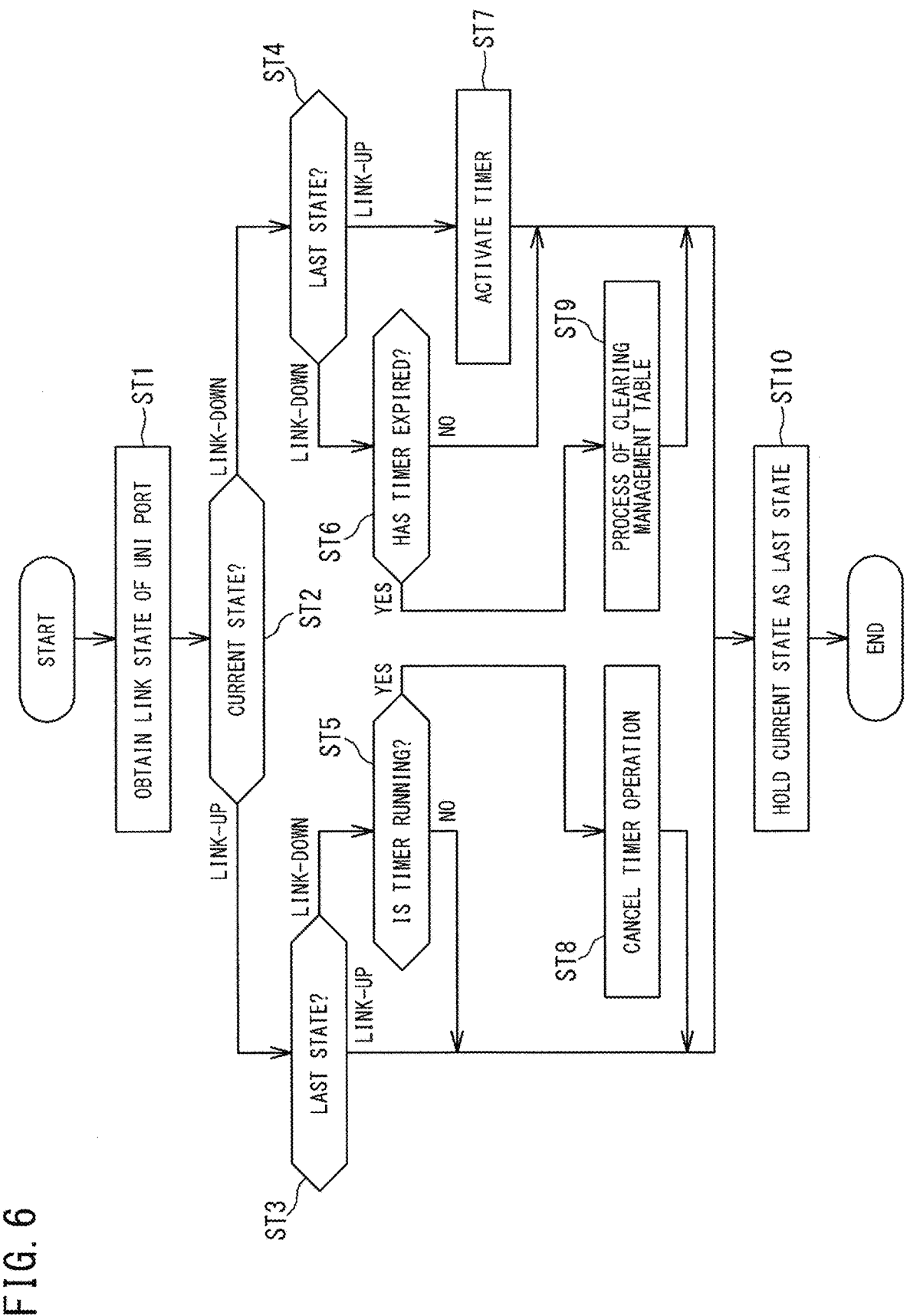
FIG. 6 is a flowchart showing an example of a process of determining a link state.

FIG. 6 is a flowchart showing an example of a process of determining a link state of the UNI port 35 or 36 which is performed by the management control unit 37 of the ONU 12. The determination process of FIG. 6 is performed every predetermined cycle (e.g., 500 milliseconds).

A "link-up" in FIG. 6 indicates that one of communication devices that use the UNI port is in a link-up state. A "link-down" indicates that all communication devices that use the UNI port are in a link-down state.

As shown in FIG. 6, the management control unit 37 obtains a link state of the UNI port 35 or 36 from the UNI processing unit 34 in a current cycle (step ST1). Specifically, the management control unit 37 reads the content of data of a monitoring signal S3 received from the UNI processing unit 34.

Then, the management control unit 37 compares a link state (current state) in the last cycle with the link state (current state) in the current cycle, and performs predetermined operation according to a result of the comparison (step ST2 to ST10). Specifically, the operation is as follows.

If the link state in the current cycle is a link-up (a determination result at step ST2 is a "link-up") and the link state in the last cycle is a link-up (a determination result at step ST3 is a "link-up"), the management control unit 37 sets the current state as the last state without performing any particular process (step ST10).

If the link state in the current cycle is a link-down (a determination result at step ST2 is a "link-down") and the link state in the last cycle is a link-up (a determination result at step ST4 is a "link-up"), since the state is transitioning from the link-up to the link-down, the management control unit 37 activates a timer (not shown) held therein (step ST7), and then sets the current state as the last state (step ST10).

If the link state in the current cycle is a link-up (a determination result at step ST2 is a "link-up") and the link state in the last cycle is a link-down (a determination result at step ST3 is a "link-down"), since the state is transitioning from the link-down to the link-up, the management control unit 37 determines whether the timer is running (step ST5).

If the above-described determination result is affirmative, the management control unit 37 cancels (stops) the operation of the timer (step ST8), and then sets the current state as the last state (step ST10).

If the above-described determination result is negative, the management control unit 37 sets the current state as the last state without canceling the operation of the timer (step ST10).

If the link state in the current cycle is a link-down (a determination result at step ST2 is a "link-down") and the link state in the last cycle is a link-down (a determination result at step ST4 is a "link-down"), since the link-down state is continuing, the management control unit 37 determines whether a timer value has been reached (step ST6).

If the above-described determination result is affirmative, the management control unit 37 performs the aforementioned process of clearing a management table (step ST9), and then sets the current state as the last state (step ST10).

If the above-described determination result is negative, the management control unit 37 sets the current state as the last state without performing the aforementioned process of clearing a management table (step ST10).

In the determination process of FIG. 6, the timer's expiration time has approximately the same set value as the aforementioned predetermined time T, and is set to, for example, 10 seconds.

However, as will be described later, the set value of the timer's expiration time can be changed by an operational input to the external device 25 or 41 by a network administrator of the telecommunications carrier.

[Content of Control Information That can be Set on the ONU]

In the present embodiment, the external devices 25 and 41 can transmit a management frame including control information for the ONU 12 to the management control unit 37 of the ONU 12.

The management frame transmitted from the external device 25 is transmitted to the management control unit 37 through a communication path: the management control unit 24 of the OLT 11→the L2 switch 23→the PON processing unit 22→the PON line 13→the line concentrating unit 32→the management control unit 37 of the ONU 12.

Therefore, by the network administrator of the telecommunications carrier inputting control information to the external device 25 connected to the OLT 11, control information for the ONU 12 can be set on the ONU 12 by a remote operation.

The external device 25 may transmit a management frame to the management control unit 37 of the ONU 12 by communication through the upper network. The external device 41 is directly connected to the ONU 12, and thus, can directly transmit a management frame to the management control unit 37.

Control information in a management frame transmitted to the management control unit 37 can include, for example, the following information 1 to 3. The type in information 2 is, for example, a restart of a PON processing unit 33 or erasing of data in a management table.

Information 1) The set value of timer's expiration time (e.g., several seconds to infinity)

Information 2) The type of a process of clearing a management table

Information 3) The type of a UNI port used in a user's home

When the control information in the management frame includes information 1, the management control unit 37 performs the determination process of FIG. 6, with the set value in the information 1 being the timer's expiration time (predetermined time T).

When the control information in the management frame includes information 2, the management control unit 37 performs a clearing process of the type described in the information 2.

When the control information in the management frame includes information 3, the management control unit 37 transmits to a UNI processing unit 34 an instruction S2 to switch to a UNI port (the first port 35 or the second port 36) of the type described in the information 3.

Therefore, the network administrator of the telecommunications carrier can set, from the external devices 25 and 41, the set value of the predetermined time T which is a delay time for a clearing process, the type of a clearing process performed by the management control unit 37, selection of the UNI port 35 or 36 for each of the users' homes A to C, etc.

[First Variant]

Figure 7:
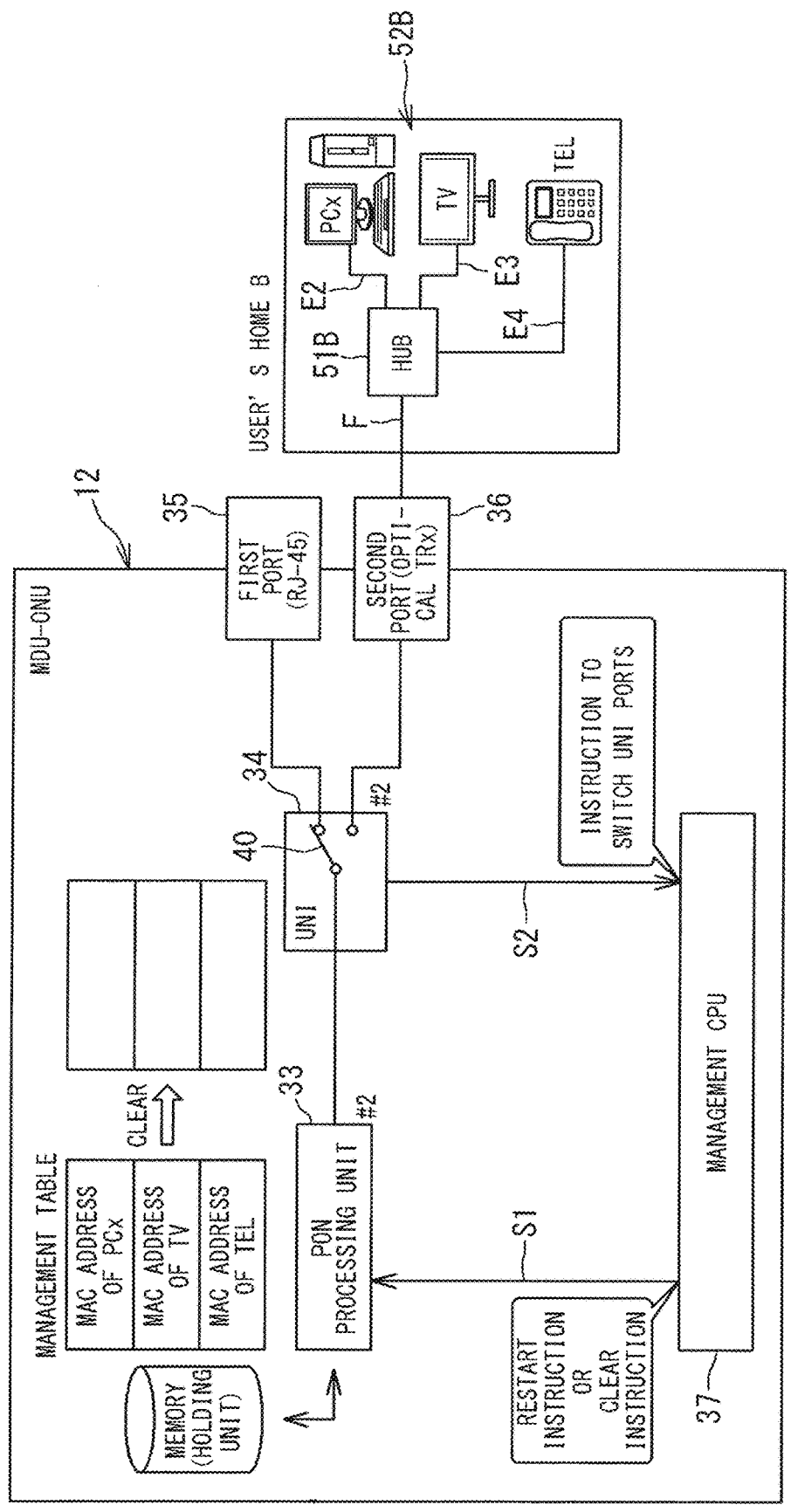
FIG. 7 is an illustrative diagram showing a variant of a process of clearing a management table.

FIG. 7 is an illustrative diagram showing a variant of a process of clearing a management table performed by the management control unit 37.

The clearing process of FIG. 7 differs from the clearing process of FIG. 5 according to the above-described embodiment in that the management control unit 37 transmits control information S1 for a management table to the PON processing unit 33 on condition of transmission of a control signal (a switching instruction for a switch 30) S2 to the UNI processing unit 34.

The management control unit 37 may perform both of the clearing process of FIG. 5 and the clearing process of FIG. 7, or may perform only the clearing process of FIG. 5.

According to a first variant, the management control unit 37 allows the #2 PON processing unit 33 to clear the management table, which is triggered by transmission of a control signal (switching instruction) S2 for the UNI port 35 or 36.

Hence, for example, when a user at the user's home B changes a communication line pulled into the home from the LAN cable E to an optical fiber F, only by connecting one or a plurality of communication devices such as user terminals 52B to the changed optical fiber F, the MAC addresses of the communication devices can be registered in the management table of the PON processing unit 33.

[Second Variant]

In the above-described embodiment, when the number of pieces of data in the management table held in the PON processing unit 33 has reached the upper limit, the PON processing unit 33 may transmit a control signal indicating such a fact to the management control unit 37, and the management control unit 37 may perform a process for informing a user that the number of pieces of data in the management table has reached the upper limit, which is triggered by reception of the control signal. For this informing process, for example, the following processes 1 and 2 are considered.

Process 1) A communication message including a control signal for turning on or turning off and on an indicator (e.g., an LED) of the relay device 51A or 51B is transmitted to the relay device 51A or 51B.

Process 2) A communication message including alert information indicating that the number of pieces of data has reached the upper limit is transmitted to the user terminal 52A or 52B such as a personal computer. The communication message may be transmitted in response to reception of a request message from the user terminal 52A or 52B.

As such, by the management control unit 37 transmitting a communication message for informing a user that the number of pieces of data in the management table has reached the upper limit, the user can become aware in advance of the fact that any more communication devices cannot be newly connected.

Hence, the frequency of users inquiring the telecommunications carrier by phone, etc., about not being able to newly connect a communication device decreases, enabling to reduce the management costs of both the telecommunications carrier and the users.

[Third Variant]

Although the above-described embodiment exemplifies a case in which a station side device and a home side device are the OLT 11 and the ONU 12, the station side device and the home side device may be, for example, line terminal devices of a coaxial distribution network (CDN) system that uses coaxial cables as communication lines.

The CDN is a network in which a coax line terminal (CLT) which is a station side device and a plurality of coax network units (CNUs) which are home side devices are connected to each other in a one-to-multiple manner by branched coaxial cables. A splitter for a CATV or the like is used at a branched portion of the coaxial cables.

In the CDN system, too, the MPCP is used for registration of CNUs and upstream multiple access control. Namely, although the CDN and the PON differ in their transmission media, the CDN and the PON are substantially the same in their logical operation in a system performed for upstream access control.

Therefore, a home side device of the present embodiment may be, for example, a CNU of a CDN system, instead of an ONU 12 of a PON system.

[Other Variants]

The above-described embodiment is to be considered in all respects as illustrative and not restrictive. The scope of the present invention is indicated by the claims rather than the foregoing description, and all changes which come within the meaning and range of equivalency of the claims are therefore intended to be embraced therein.

For example, although the above-described embodiment exemplifies a case in which the ONU 12 is an MDU-ONU, the ONU 12 may be an ONU for a single home that includes only one PON processing unit 33 and one UNI processing unit 34.

The ONU 12 for a single home is installed in a user's home and communication lines for a plurality of users' homes are not connected to the single ONU 12, and thus, even if the ONU 12 restarts, communication at other users' homes is not interrupted.

Therefore, in the case of the ONU 12 for a single home, a clearing process which is automatically performed by the management control unit 37 may include a restart involving power-off of the ONU 12.

In the case of the ONU 12 for a single home, too, a management table is cleared by an automatic clearing process performed by the management control unit 37.

Therefore, there is an advantage that the MAC address of a new communication device (e.g., a personal computer PCy) can be registered in the management table of the PON processing unit 33 without a user manually restarting the ONU 12.

In the above-described embodiment, a process of clearing a management table does not necessarily need to be a process of making all entries included in the management table available, and is a process of providing one or more free entries in the management table.

REFERENCE SIGNS LIST

10: PON SYSTEM
11: STATION SIDE DEVICE (OLT)
12: HOME SIDE DEVICE (ONU)
13: PON LINE
14: OPTICAL SPLITTER
15: TRUNK OPTICAL FIBER
16: BRANCH OPTICAL FIBER
21: OPTICAL TRANSCEIVER
22: PON PROCESSING UNIT
23: L2 SWITCH
24: MANAGEMENT CONTROL UNIT
25: EXTERNAL DEVICE
31: OPTICAL TRANSCEIVER
32: LINE CONCENTRATING UNIT
33: PON PROCESSING UNIT (ACCESS PROCESSING UNIT, HOLDING UNIT)
34: UNI PROCESSING UNIT (DETECTING UNIT)
35: FIRST PORT (UNI PORT)
36: SECOND PORT (UNI PORT)
37: MANAGEMENT CONTROL UNIT (CONTROL UNIT)
38: COMBINING UNIT
39: DISTRIBUTING UNIT
40: SWITCH
41: EXTERNAL DEVICE
42: COAXIAL ADAPTER
50: IN-HOME COMMUNICATION SYSTEM
51A: RELAY DEVICE (COMMUNICATION DEVICE)
51B: RELAY DEVICE (COMMUNICATION DEVICE)
52A: USER TERMINAL (COMMUNICATION DEVICE)
52B: USER TERMINAL (COMMUNICATION DEVICE)
100: MULTI-DWELLING UNIT
200: STATION BUILDING
A: USER'S HOME
B: USER'S HOME
C: USER'S HOME
D: MANAGEMENT ROOM
E: LAN CABLE
F: OPTICAL FIBER
G: COAXIAL CABLE

The invention claimed is:

1. A home side device comprising:
a UNI port for a communication line used by one or a plurality of communication devices in a user's home;
an access processing unit that performs upstream access control;
a holding unit that holds a management table of address information of the communication devices;
a detecting unit that detects link states of the communication devices; and
a control unit that performs a process of clearing the management table when a link-down of all of the communication devices has been detected, wherein
the control unit is capable of communicating with the communication devices, and
when a number of pieces of data in the management table has reached an upper limit, the control unit transmits a communication message to the communication devices, the communication message being for informing a user at the user's home that the number of pieces of data in the management table has reached the upper limit.

2. A home side device comprising:
a UNI port for a communication line used by one or a plurality of communication devices in a user's home;
an access processing unit that performs upstream access control;
a holding unit that holds a management table of address information of the communication devices;
a detecting unit that detects link states of the communication devices;
a control unit that performs a process of clearing the management table when a link-down of all of the communication devices has been detected;
UNI ports of a plurality of types whose connectable communication lines differ from each other; and
a switch for selecting any of the UNI ports used in the user's home, wherein
the control unit performs the clearing process when transmitting to the switch an instruction to switch the UNI ports.

* * * * *